(12) United States Patent
Kessler et al.

(10) Patent No.: US 11,021,826 B2
(45) Date of Patent: Jun. 1, 2021

(54) CHECKING FOR POTENTIALLY UNDESIRABLE ITEMS OF LAUNDRY

(71) Applicant: Henkel AG & Co. KGaA, Duesseldorf (DE)

(72) Inventors: Arnd Kessler, Monheim am Rhein (DE); Christian Nitsch, Duesseldorf (DE); Lars Zuechner, Langenfeld (DE); Georg Wawer, Vienna (AT); Alexander Mueller, Monheim (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 123 days.

(21) Appl. No.: 16/318,113

(22) PCT Filed: Jul. 11, 2017

(86) PCT No.: PCT/EP2017/067330
§ 371 (c)(1),
(2) Date: Jan. 15, 2019

(87) PCT Pub. No.: WO2018/011168
PCT Pub. Date: Jan. 18, 2018

(65) Prior Publication Data
US 2019/0264372 A1    Aug. 29, 2019

(30) Foreign Application Priority Data

Jul. 15, 2016    (DE) ..................... 10 2016 212 984.8

(51) Int. Cl.
*D06F 34/18*    (2020.01)
*D06F 34/28*    (2020.01)
(Continued)

(52) U.S. Cl.
CPC .............. *D06F 34/18* (2020.02); *D06F 34/28* (2020.02); *D06F 39/024* (2013.01); *D06F 39/14* (2013.01);
(Continued)

(58) Field of Classification Search
CPC ........ D06F 34/18; D06F 34/28; D06F 39/024; D06F 39/14; D06F 2202/10;
(Continued)

(56) References Cited

U.S. PATENT DOCUMENTS

| 6,784,997 B2 | 8/2004 | Lorenz et al. |
| 7,904,985 B2 * | 3/2011 | Hendrickson ........... D06F 39/02 8/159 |

(Continued)

FOREIGN PATENT DOCUMENTS

| CN | 101484626 A | 7/2009 |
| CN | 102505414 A | 6/2012 |

(Continued)

OTHER PUBLICATIONS

EPO, International Search Report and Written Opinion issued in International Application No. PCT/EP2017/067330, dated Sep. 25, 2017.

(Continued)

*Primary Examiner* — Joseph L. Perrin
(74) *Attorney, Agent, or Firm* — Lorenz & Kopf, LLP (57) ABSTRACT

The present disclosure relates inter alia to a method which is carried out by at least one device, the method comprising: illuminating (510) at least some of the items of laundry which are located in a laundry container (302) of a washing machine (300) and are to be subjected to a washing process; determining (520) color information indicative of one or more colors of at least some of the illuminated items of laundry (320) which are located in the laundry container (Continued)

(302) of the washing machine (300); and checking (530), at least partially based upon the determined color information, whether a potentially undesirable item of laundry (322) is located in the laundry container (302) of the washing machine (300).

14 Claims, 6 Drawing Sheets

(51) Int. Cl.
| | |
|---|---|
| *D06F 105/62* | (2020.01) |
| *D06F 103/02* | (2020.01) |
| *D06F 101/02* | (2020.01) |
| *D06F 105/58* | (2020.01) |
| *G01J 3/02* | (2006.01) |
| *G01J 3/46* | (2006.01) |
| *G01J 3/51* | (2006.01) |
| *D06F 39/14* | (2006.01) |
| *D06F 39/02* | (2006.01) |

(52) U.S. Cl.
CPC ...... *D06F 2101/02* (2020.02); *D06F 2103/02* (2020.02); *D06F 2105/58* (2020.02); *D06F 2105/62* (2020.02); *D06F 2202/10* (2013.01); *D06F 2210/00* (2013.01); *G01J 3/0264* (2013.01); *G01J 3/0291* (2013.01); *G01J 3/463* (2013.01); *G01J 3/513* (2013.01)

(58) Field of Classification Search
CPC ............. D06F 2210/00; D06F 2101/02; D06F 2103/02; D06F 2105/58; D06F 2105/62
See application file for complete search history.

(56) References Cited

U.S. PATENT DOCUMENTS

| | | | |
|---|---|---|---|
| 9,150,995 | B2 | 10/2015 | Ius et al. |
| 2008/0276655 | A1* | 11/2008 | Luckman .............. D06F 35/008 68/12.12 |
| 2008/0276964 | A1 | 11/2008 | Hendrickson et al. |
| 2008/0276965 | A1* | 11/2008 | Aykroyd ................. D06F 33/00 134/18 |
| 2010/0205820 | A1* | 8/2010 | Ashrafzadeh ........ G01N 21/255 34/389 |
| 2016/0160432 | A1* | 6/2016 | Ashrafzadeh ........... D06F 34/22 8/137 |

FOREIGN PATENT DOCUMENTS

| | | |
|---|---|---|
| CN | 103998671 A | 8/2014 |
| DE | 19756515 A1 | 6/1999 |
| DE | 102013210996 A1 | 12/2014 |
| WO | 2008000812 A1 | 1/2008 |
| WO | 2010076157 A1 | 7/2010 |
| WO | 2012089605 A1 | 7/2012 |

OTHER PUBLICATIONS

Maschal, Robert A. JR. et al.: "Review of Bayer Pattern Color Filter Array (CFA) Demosaicing with New Quality Assessment Algorithms"—ARL-TR-5061; Jan. 2010.

* cited by examiner

CHECKING FOR POTENTIALLY UNDESIRABLE ITEMS OF LAUNDRY

CROSS-REFERENCE TO RELATED APPLICATION

This application is a U.S. National-Stage entry under 35 U.S.C. § 371 based on International Application No. PCT/EP2017/067330, filed Jul. 11, 2017 which was published under PCT Article 21(2) and which claims priority to German Application No. 10 2016 212 984.8, filed Jul. 15, 2016, which are all hereby incorporated in their entirety by reference.

TECHNICAL FIELD

The present disclosure relates, inter alia, to methods and devices which can be used in particular to prevent undesirable items of laundry being washed in washing processes.

BACKGROUND

Washing machines may have various different designs. A distinction is made between top-loading washing machines, in which the loading opening is on the top, and front-loading washing machines, in which a porthole on the front serves as the loading opening. An advantage of top-loading washing machines is that it is easier to construct the door seal and the drum can be supported on two sides by roller bearings, and a top-loading washing machine can also be positioned in very small spaces where there is not enough space to open a front door. By contrast, a front-loading washing machine provides space on top for e.g. a tumble dryer or for a worktop, and is therefore sometimes built into a kitchen unit instead of a floor unit. Top-loading washing machines are disadvantageous since they require a greater volume of water for washing laundry than front-loading washing machines.

American top-loading washing machines always have a rotating drum and mixing elements (agitators or discs), with the mixing elements being able to move in or counter to the rotational direction of the drum. The machines may comprise a suds circulator and injectors for the suds. In principle, a distinction is made between deep-fill and HE top-loading washing machines. Deep-fill top-loading washing machines operate using predetermined water levels, and therefore do not use load detection. HE washing machines generally have load detection and control the quantities of water in accordance therewith. Generally, the machines do not have an integrated heater, but instead are connected to a hot water feed.

It is known from the prior art to equip a washing machine with sensors in order to determine various parameters related to a washing process. For example, an amount sensor can be provided to determine the amount of laundry. Information of this kind can then influence the washing process, for example the quantity of water.

Determining the color of the laundry in a drum of a washing machine is also known from the prior art. However, a problem in this case is that there is little light in a washing drum after the loading door has been closed. In addition, washing machines are often located in dark spaces (e.g. in a basement). This can make determining the color of the laundry more difficult, or can impair the accuracy of the determined color.

EP 2 659 047 B1 discloses a washing machine which comprises a drum, a loading opening, bellows, and a cover which has a frame and a glass pane. The washing machine also comprises one or more light-dependent resistors which are arranged on the bellows and detect the light level in the drum, and the value of which changes depending on the light level in the drum. The control unit makes it possible to control the washing process. Furthermore, a plurality of light sources are provided which are arranged on the glass pane such that the light level detected by the light-dependent resistors changes depending on the loading rate of the drum. A control unit is intended to make it possible to determine the color of the laundry which is put into the drum in accordance with the detected light level, and to start the washing process in accordance with this data.

In this case, however, only an average color of the entire laundry is determined. It is also possible for individual items of laundry to be covered, and the color thereof therefore cannot be observed.

It is therefore possible for undetected items of laundry to be unintentionally contained in the laundry load to be washed. A colored item of clothing that is included in a load of white laundry can therefore remain undetected, for example, and cause the white laundry to be discolored during washing.

There is therefore also a need for the user to be assisted in the preparation of washing processes, so that operating errors can be detected by the user, in particular while loading the washing machine, and the washing result is not impaired.

BRIEF SUMMARY

This disclosure provides a method carried out by at least one device. The method includes illuminating at least a part of items of laundry which are located in a laundry container of a washing machine and are to be subjected to a washing process, determining color information that is indicative of one or more colors of at least part of the illuminated items of laundry that are located in the laundry container of the washing machine, and checking, based at least in part on the determined color information, whether a potentially undesirable item of laundry is located in the laundry container of the washing machine.

This disclosure also provides a device including at least one processor and at least one memory comprising computer program code, wherein the at least one memory and the computer program code are designed to execute and/or control at least one method, such as the aforementioned method, using the at least one processor.

BRIEF DESCRIPTION OF THE DRAWINGS

The present disclosure will hereinafter be described in conjunction with the following drawing figures, wherein like numerals denote like elements, and.

DETAILED DESCRIPTION

The following detailed description is merely exemplary in nature and is not intended to limit the disclosure or the application and uses of the subject matter as described herein. Furthermore, there is no intention to be bound by any theory presented in the preceding background or the following detailed description.

Against this background, the problem addressed by the present disclosure is in particular that of assisting the user in the preparation of washing processes, so that operating errors are detected by the user, in particular when loading the washing machine, and the washing result is not impaired.

According to a first aspect of the present disclosure, a method is described which is carried out by at least one device, the method comprising: illuminating at least some of the items of laundry which are located in a laundry container of a washing machine and are to be subjected to a washing process; determining color information that is indicative of one or more colors of at least some of the illuminated items of laundry that are located in the laundry container of the washing machine; and checking, based at least in part on the determined color information, whether a potentially undesirable item of laundry is located in the laundry container of the washing machine.

According to a second aspect, a device is also described that is designed or comprises corresponding elements for carrying out and/or controlling a method according to the first aspect.

According to the second aspect, an alternative device is also described that comprises at least one processor and at least one memory comprising computer program code, the at least one memory and the computer program code being designed to execute and/or control at least one method according to the first aspect using the at least one processor. A processor is for example intended to be understood to be a control unit, a microprocessor, a microcontrol unit such as a microcontroller, a digital signal processor (DSP), an application-specific integrated circuit (ASIC) or a field programmable gate array (FPGA).

For example, an exemplary device further comprises elements for storing information, such as a program memory and/or a main memory. For example, an exemplary device as contemplated herein further comprises elements for respectively receiving and/or transmitting information (communication interface), for example via a network by employing a network interface. For example, exemplary devices are and/or can be interconnected via one or more networks. For example, the communication interface is designed to communicate with a wireless network (for example in accordance with the IEEE 802.11 standard, the Bluetooth (LE) standard and/or the NFC standard).

An exemplary device according to the second aspect for example is or comprises a data-processing system set up using software and/or hardware in order to execute the respective steps of an exemplary method according to the first aspect.

The method according to the first aspect can, for example, be carried out by a device according to the second aspect.

By illuminating at least some of the items of laundry, sufficient illumination of the items of laundry is ensured irrespective of the external conditions. As a result, color information can be determined even in bad external conditions, such as little daylight in a dark space, or at least the quality of the determination can be improved. As a result, based on the determined color information, it can be reliably checked whether a potentially undesirable item of laundry is located in the laundry container of the washing machine.

Illumination is understood to mean that light is generated by employing an artificial light source, such that the items of laundry can be (better) made visible in particular. The illumination is provided in particular by radiation which is at least in part in the visible range of the electromagnetic spectrum, for example using radiation of which the wavelength covers at least part of the wavelength range of from about 380 nm to about 780 nm.

A laundry container can be a washing drum of a washing machine or comprise said drum, for example. The washing machine can be a domestic washing machine, for example. For example, the washing machine is a drum washing machine. For example, the washing drum rotates about a horizontal axis. For example, the washing machine is a front-loading washing machine in which a loading door (in particular comprising a porthole) serves as the loading opening on the front.

A washing process can for example comprise soaking, a prewash, a main washing process, rinsing, softening, starching, and/or final spinning.

An item of laundry is understood in particular to mean a washable textile. An item of laundry can therefore be, for example, an item of household linen, an item of bed linen, an item of outer clothing, a curtain, an upholstery cover, etc. The items of laundry are dirty laundry, for example.

Color information that is indicative of one or more colors of an item of laundry can, for example, comprise information that is representative of a color hue, brightness and/or saturation of a color. Color information can, for example, comprise information that is representative of one or more values of a color space. Color information does not necessarily have to contain information that is indicative of a bright color of an item of laundry, but can also just contain information on the brightness of an item of laundry. Color information can, for example, be determined by one or more (digital) images or one or more (digital) videos being taken. The color information can be contained in raw data of a detector or sensor, for example. The color information can be contained in processed or edited data of a detector or sensor, for example.

The check being based on the determined color information can mean that the check can be based directly on the determined color information or indirectly on the determined color information (for example on information derived from the color information).

A potentially undesirable item of laundry is understood to mean, for example, an item of laundry which is assumed to be undesirable in the washing process and/or is not intended to be washed together with the remaining items of laundry. Predefined criteria can be used for this purpose, for example. For example, a colored item of laundry among otherwise white items of laundry can be potentially undesirable. Likewise, a white item of laundry among otherwise colored items of laundry can be potentially undesirable. A potentially undesirable item of laundry is in this case understood to mean at least one potentially undesirable item of laundry.

According to one embodiment of the method according to the first aspect, the illumination is provided by at least one lighting unit and/or the color information is determined by at least one detector unit.

Accordingly, according to one embodiment of the device according to the second aspect, the device comprises at least one lighting unit and at least one detector unit. In this case, the device can be the washing machine or be part thereof or be separate from the washing machine.

The lighting unit and the detector unit form a structural unit, for example, or are integral (for example designed as a lighting-detector device). It is also possible for the lighting unit and the detector unit to be separate (for example designed as two separate structural units or devices).

A lighting unit comprises in particular at least one light source. For example, the lighting unit comprises one or more light-emitting diodes. As already explained, the lighting unit is designed in particular to generate radiation which is at least in part in the visible range of the electromagnetic spectrum, for example radiation of which the wavelength covers at least part of the wavelength range of from about 380 nm to about 780 nm.

The detector unit comprises in particular an optoelectronic sensor or optical detector. Examples of optical detectors include a CMOS sensor (which can advantageously achieve a low overall size, low power consumption and high image rates), a CCD sensor (which can advantageously achieve high resolution and wide spectral sensitivity), a photodiode (which can be used as a fast sensor for visible light, infrared and ultraviolet), a phototransistor (which can advantageously achieve a high signal) or a photoresistor (which is cheap and easy to handle). The detector unit is designed to provide images or videos, for example. The detector unit can, for example, be designed to detect color hue, saturation and/or brightness and can, for example, provide color or black and white images. For example, the detector unit is designed to detect radiation in a particular wavelength range. For example, the detector unit is adjusted to the lighting unit; for example the wavelength range of radiation that is emitted by the lighting unit overlaps, at least in regions, with the wavelength range of radiation that can be detected by the detector unit. For example, the detector unit is or comprises a (digital) camera for taking static or moving images.

According to one embodiment of the method according to the first aspect, the lighting unit and/or the detector unit are or can be arranged inside the laundry container of the washing machine.

For example, the detector unit and/or the lighting unit are arranged in the region of a loading opening of the washing machine. For example, the detector unit and/or the lighting unit are arranged in the region of a door of the washing machine. For example, the detector unit and/or the lighting unit are arranged in the region of the laundry container seal.

By arranging the detector unit and/or the lighting unit inside the laundry container of the washing machine, the detector unit or lighting unit can be arranged in proximity to the items of laundry, which can improve the quality of the determined color information. If the detector unit and/or the lighting unit are also immovably arranged inside the laundry container, the illumination or detection can be optimized with respect to this position.

According to one embodiment of the method according to the first aspect, the lighting unit and/or the detector unit are designed to be freely movable inside the laundry container of the washing machine.

By designing the lighting unit and/or the detector unit to be freely movable, the lighting unit or detector unit can be mixed with the items of laundry. This can increase the likelihood of detecting a potentially undesirable item of laundry. In particular, color information can be determined from different locations inside the laundry container.

For example, the lighting unit and/or the detector unit form a structural unit that is separate from the washing machine (for example a lighting-detector device). The lighting unit and/or the detector unit can then also be introduced into the laundry container when loading the washing machine with the items of laundry. For example, the lighting unit and/or the detector unit are (together or separately) accommodated in a housing that has particularly few corners, for example a substantially spherical housing. For example, the housing is at least partially resilient or not rigid. This can eliminate or reduce the risk of the items of laundry being damaged by the lighting unit and/or the detector unit. For example, the housing is watertight.

For example, the detector unit has a detection angle, at least in one plane, of at least about 45°, preferably at least about 90°, more preferably at least about 180°, and even more preferably at least about 270°. For example, the detector unit has a detection angle of about 360° at least in one plane. For example, the camera has a detection angle of about 360° in both a horizontal plane and in a vertical plane. For example, the detector unit is or comprises an omnidirectional detector (for example an omnidirectional camera). This can further increase the likelihood of detecting a potentially undesirable item of laundry.

According to one embodiment of the method according to the first aspect, the lighting unit and/or the detector unit are or can be arranged outside the laundry container of the washing machine.

Arranging the lighting unit and/or the detector unit outside the laundry container means that these do not need to be watertight. In addition, the lighting unit and/or the detector unit only have to be designed for lower mechanical stresses than if said units were arranged or provided inside the laundry container.

For example, the lighting unit and/or the detector unit are designed to be fastened to the washing machine, for example to the loading door of the washing machine. For example, the lighting unit and/or the detector unit can be interlockingly (for example by latching), non-positively (for example by employing clamping) and/or integrally (for example by employing adhering) fastened to the loading door or in the region of the loading door. Since the loading door is generally partially transparent, for example comprises a porthole, both illumination and determination of color information can occur from outside through the door of the washing machine.

According to one embodiment of the method according to the first aspect, the method also comprises subjecting the determined color information to a processing algorithm.

As a result, a better differentiation between differently colored items of laundry can be achieved. An assessment that rather corresponds to human color perception can also be made. For example, the determined color information is subjected to a conversion algorithm. For example, the determined color information (for example from one or more images) can be converted from a first color space into a second color space. Examples of color spaces include, for example, an RGB color space or an L*a*b* color space. For example, the determined color information is converted from an RGB color space into an L*a*b* color space.

An RGB color space is understood to mean an additive color space which reproduces color perceptions by additively mixing three base colors (red, green and blue). An example of an L*a*b* color space is, for example, the CIELAB color space, which is standardized in the EN ISO 11664-4 "Colorimetry—Part 4: CIE 1976 L*a*b* Colour space" (CIE 1976 color space). In this case it is advantageous that colors are defined independently of their generation or reproduction technique in such a way as they are perceived by a normal observer in a standard light condition (device-independence and perception relatedness).

According to one embodiment of the method according to the first aspect, the method also comprises establishing that a potentially undesirable item of laundry is located in the laundry container of the washing machine when, based on the determined color information, a color difference reaches or exceeds a predefined color difference.

As a result, a potentially undesirable item of laundry can be detected in a reliable manner. Since the color difference is based on the determined color information, the color difference is representative of the color difference of the colors of at least some of the items of laundry located in the laundry container of the washing machine. Color difference is understood to mean, in particular, a difference between two color locations in a color space. In this case, observing a color difference in an equally spaced color space, such as an L*a*b* color space, is advantageous. For example, the color difference ΔE in the L*a*b* color space is determined by $$\Delta E^2 = (\Delta L^*)^2 + (\Delta a^*)^2 + (\Delta b^*)^2$$

An example for calculating the color difference can be found in section 5.1.2 in "Review of Bayer Pattern Color Filter Array (CFA) Demosaicing with New Quality Assessment Algorithms" by Robert A. Maschal Jr., S. Susan Young, Joe Reynolds, Keith Krapels, Jonathan Fanning, and Ted Corbin, ARL-TR-5061, January 2010, with reference being explicitly made to the disclosure of this section by incorporation by reference.

However, in principle it is conceivable that, alternatively or in addition, a potentially undesirable item of laundry in the laundry container of the washing machine can be identified in other cases or under other conditions.

According to one embodiment of the method according to the first aspect, the method also comprises thoroughly mixing the items of laundry located in the laundry container of the washing machine before the washing process begins, in particular at least temporarily during illuminating and/or determining the color information.

This reduces or eliminates the risk of a potentially undesirable item of laundry not being detected due to the positioning thereof in the laundry container because, for example, it is covered by other items of laundry that are not potentially undesirable. Thoroughly mixing before the washing process begins is understood to mean, in particular, that the items of laundry located in the laundry container are thoroughly mixed while dry, i.e. before water and/or washing agent have been rinsed into the laundry container. In the case of a drum washing machine, the thorough mixing can occur by rotating the drum.

It is conceivable for thorough mixing to occur in each case before illuminating and determining the color information, and that repeating the process (once or several times) increases the likelihood of detecting a potentially undesirable item of laundry. However, it has been shown to be advantageous that illuminating and determining the color information occurs at least temporarily during the thorough mixing.

According to one embodiment of the method according to the first aspect, the thorough mixing is carried out in such a way that the items of laundry located in the laundry container of the washing machine are temporarily in free fall.

This achieves a higher degree of mixing, such that the color information is indicative of the color or colors of as many items of laundry as possible or of all the items of laundry. The likelihood that a potentially undesirable item of laundry can be found is therefore increased further. In this case, the items of laundry are preferably thoroughly mixed in such a way that the items of laundry are moved toward an upper region of the laundry container ("upper dead center") and from there free fall down.

According to one embodiment of the method according to the first aspect, the method also comprises establishing that the items of laundry located in the laundry container of the washing machine are temporarily in free fall, at least based on at least one parameter of the drive driving the washing machine.

For example, the rotational speed of the drive (for example an electric motor) is in particular continuously changed, for example increased. In so doing, the current consumption of the drive can be monitored, for example. It has been shown that the current consumption of the drive can be used as a parameter of the drive in order to establish that the items of laundry are moved up into the upper region and free fall down.

According to one embodiment of the method according to the first aspect, the method also comprises preventing or pausing the washing process if it is established that a potentially undesirable item of laundry is located in the laundry container of the washing machine.

Preventing a planned washing process (that has been selected by a user, for example) or pausing a washing process that has already begun in part can prevent the potentially undesirable item of laundry itself or the remaining items of laundry being damaged (for example discolored) due to the potentially undesirable item of laundry.

The method can advantageously also comprise initiating a washing process if it is not established that a potentially undesirable item of laundry is located in the laundry container of the washing machine.

According to one embodiment of the method according to the first aspect, the method also comprises providing or triggering provision of an output to a user if it is established that a potentially undesirable item of laundry is located in the laundry container of the washing machine.

In so doing, a user is given the opportunity to assess whether the potentially undesirable item of laundry is actually an item of laundry that is undesirable in the washing process or whether it has been deliberately added to the items of laundry for the washing process (and is therefore not an undesirable item of laundry) or whether it should be tolerated even though it is an undesirable item of laundry. The output to the user can, for example, inform the user that a potentially undesirable item of laundry is located in the laundry container. For example, the output to the user can be visual, haptic or acoustic. For example, the output to the user comprises a text message. For example, the output to the user comprises an image or a video which depicts the potentially undesirable item of laundry. An image or video taken by the detector unit can be used for this purpose, for example.

In one example, the output is provided via a user interface of the washing machine. Alternatively or in addition, the output can be provided via a user interface of a data-processing system of the user (for example a mobile device of the user). For this purpose, a device comprising the detector unit can communicate with the washing machine or the data-processing system of the user, for example, in a wireless or wired manner.

According to one embodiment of the method according to the first aspect, the method also comprises initiating or resuming the washing process if approval for the washing process is obtained from the user.

As a result, a washing process that was initially prevented is initiated, for example after the user has removed the undesirable item of laundry from the laundry container of the washing machine or after the user has identified that it is not an undesirable item of laundry. For example, the user can give approval via a user interface on the washing machine or a data-processing system (for example a mobile device of the user).

According to one embodiment of the method according to the first aspect, the method also comprises initiating or resuming the washing process at or after a predefined time and optionally influencing one or more parameters of the washing process.

If, for example, a washing process is prevented or paused due to a potentially undesirable item of laundry, it may be desirable for the washing process to be initiated nevertheless. Initiating or resuming the washing process at or after a predefined time prevents the washing process from remaining completely stopped. For example, the time begins when the washing process is prevented or paused or when the output to the user is provided or the provision of said output is triggered.

However, in order to prevent or reduce damage to the potentially undesirable item of laundry or to the remaining items of laundry, one or more parameters of the washing process can preferably be influenced. For example, the items of laundry can simply be washed in a gentle wash (for example at a low temperature). Therefore, complete stoppage of the washing process can be prevented and the risk of damaging the items of laundry can be reduced.

According to one embodiment of the method according to the first aspect, the method also comprises determining one or more recommended parameters for the washing process, based at least in part on the determined color information.

The determined color information can advantageously be used not only to check whether a potentially undesirable item of laundry is located in the laundry container of the washing machine, but also to determine at least one advantageous parameter for the washing process. In so doing, the determined color information can simultaneously be used to optimize the washing process. For example, a high temperature can be determined as recommendable for white items of laundry, or the use of a color detergent (comprising a color inhibitor) can be determined as recommendable for colored items of laundry.

According to one embodiment of the method according to the first aspect, the one or more recommended parameters for the washing process comprise a temperature parameter, a spinning parameter, a washing program parameter, and/or a washing agent parameter.

A temperature parameter is representative of the washing temperature, for example. A spinning parameter is representative of whether a spin should occur or of a spin speed, for example. A washing program parameter is representative of the type of washing program (for example easy-care, color wash, hot wash), for example. A washing agent parameter is representative of the type or amount of washing agent, for example.

According to one embodiment of the method according to the first aspect, the method also comprises providing or triggering provision of a recommendation based on the one or more determined recommended parameters for the washing process to a user.

As a result, the user can be provided with additional information for the washing process. For example, the user can then check and optionally change parameters for the washing process that may have already been set. The quality of the result of the washing process can thus be improved further. For example, output to the user is provided via a user interface of the washing machine or via a user interface of a data-processing system (for example a mobile device of the user).

According to one embodiment of the method according to the first aspect, the method also comprises influencing the washing process, based at least in part on the one or more determined recommended parameters for the washing process.

This is advantageous in that the user does not have to manually adapt the parameters for the washing process. Instead, reference can be made to the determined recommended parameters in order to automatically adapt the washing process. This further increases the user-friendliness and the operating comfort for the user. This is particularly advantageous if the washing machine is provided with an automatic dosing system, in which the washing agent (for example from cartridges connected to the washing machine) can be automatically added to the washing process. In this case a plurality of cartridges can be provided which can contain different washing agents. Both the dosage and the type of washing agent can then be automatically influenced.

Alternatively, or in addition, it is conceivable for the described lighting unit and/or detector unit to also be used for identifying a washing agent, for example. The washing agent used can be visually analyzed, for example, and the washing agent can be identified as a result. Depending on the identified washing agent, the washing process can then also be influenced and, in particular, parameters for the washing process can be set.

According to a third aspect, a computer program is also described that comprises program instructions that prompt a processor to execute and/or control a method according to the first aspect when the computer program runs on the processor. An exemplary program as contemplated herein may be stored in or on a computer-readable memory medium which contains one or more programs.

According to the fourth aspect, a computer-readable memory medium is also described which contains a computer program according to the third aspect. A computer-readable memory medium may be designed e.g. as a magnetic, electrical, electromagnetic, optical and/or different memory medium. A computer-readable memory medium of this type is preferably a physical object (i.e. "tangible"); for example it is designed as a data carrier device. A data carrier device of this kind is for example portable or permanently installed in a device. Examples of a data carrier device of this type are volatile or non-volatile memories with random access (RAM), such as NOR flash memories, or with sequential access, such as NAND flash memories, and/or memories with read-only access (ROM) or read/write access. Computer-readable is for example intended to be understood to mean that the memory medium can be read and/or written by a computer or a data-processing system, for example by a processor.

According to a fifth aspect, a system is also described which comprises a plurality of devices, in particular comprising a device according to the second aspect, which together are designed to carry out a method according to the first aspect.

For example, a system according to the fifth aspect comprises a first device which comprises a lighting unit and a detector unit (e.g. a lighting-detector device), and additionally a washing machine and/or a data-processing system of the user. Examples of a data-processing system are a computer, a desktop computer, a server, a thin client and/or a portable computer (mobile device), such as a laptop computer, a tablet computer, a wearable, a personal digital assistant or a smartphone.

The exemplary embodiments of the present disclosure described above in this description are also intended to be understood to be disclosed in any combination with one another. In particular, exemplary embodiments are intended to be understood to be disclosed in relation to different aspects.

In particular, by way of the preceding or following description of method steps according to preferred embodiments of a method, corresponding elements for carrying out the method steps are also intended to be disclosed by preferred embodiments of a device. Likewise, the disclosure of a device for carrying out a method step is also intended to disclose the corresponding method step.

Further advantageous, exemplary embodiments of the present disclosure are found in the following detailed description of some exemplary embodiments of the present disclosure, in particular in conjunction with the drawings. The drawings are however only provided for illustrative purposes, and do not serve to define the scope of protection of the present disclosure. The drawings are not to scale and are merely intended to provide an example of the general concept of the present disclosure. In particular, features contained in the drawings are not in any way intended to be considered as necessary components of the present disclosure.

Figure 1:
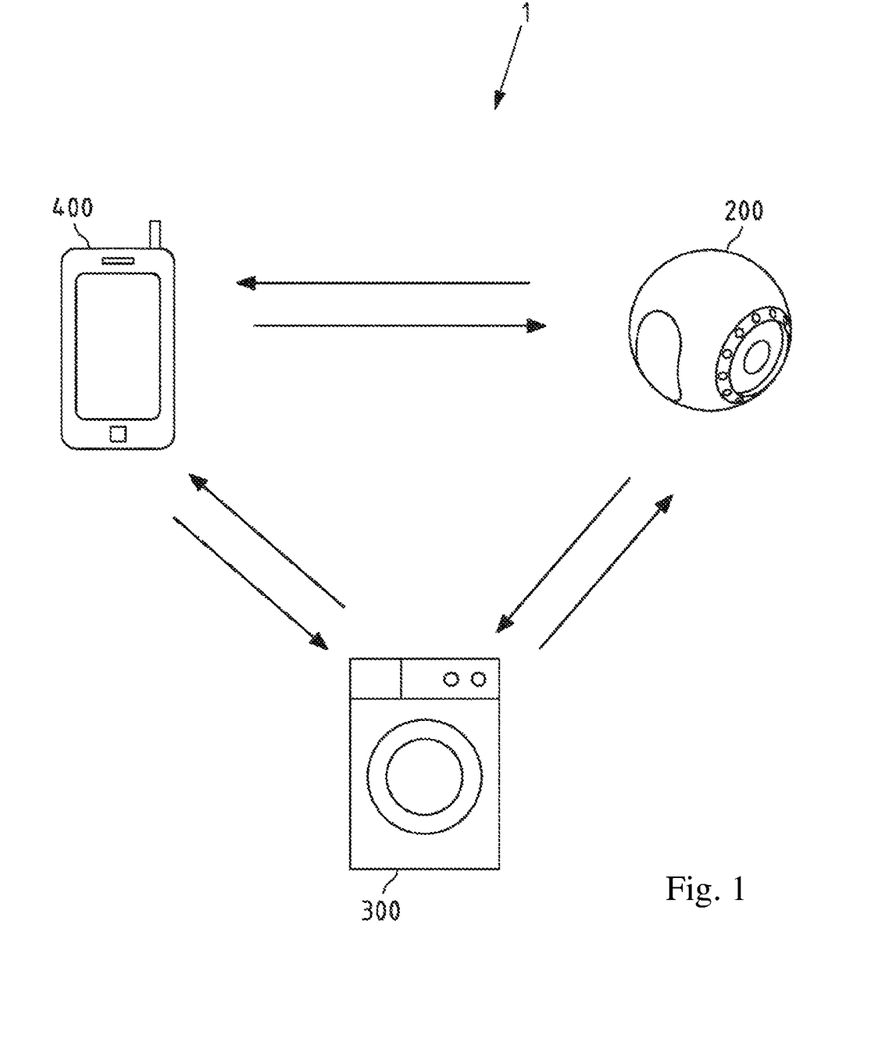
FIG. 1 is a schematic view of an embodiment of a system as contemplated herein.

FIG. 1 is a schematic view of an embodiment of a system 1 as contemplated herein comprising the devices 200, 300 and 400. The system is designed to carry out exemplary methods as contemplated herein. The device 200 is an exemplary lighting-detector device 200 and the device 300 is an exemplary washing machine 300. Both the lighting-detector device 200 and the washing machine 300 can each be a device as contemplated herein. Furthermore, the system 1 comprises the mobile device 400 in the form of a smartphone as a further device. The mobile device 400 can also carry out individual steps of an exemplary method as contemplated herein. However, the device 400 can also be a computer, a desktop computer or a portable computer, such as a laptop computer, a tablet computer, a personal digital assistant (PDA) or a wearable. The devices can each fulfil the function of a server or a client, for example. It is also conceivable for the system 1 to also comprise only two or even more than three devices.

Each of the devices 200, 300, 400 can have a communication interface in order to communicate or exchange information with one or more of the other devices.

Figure 2:
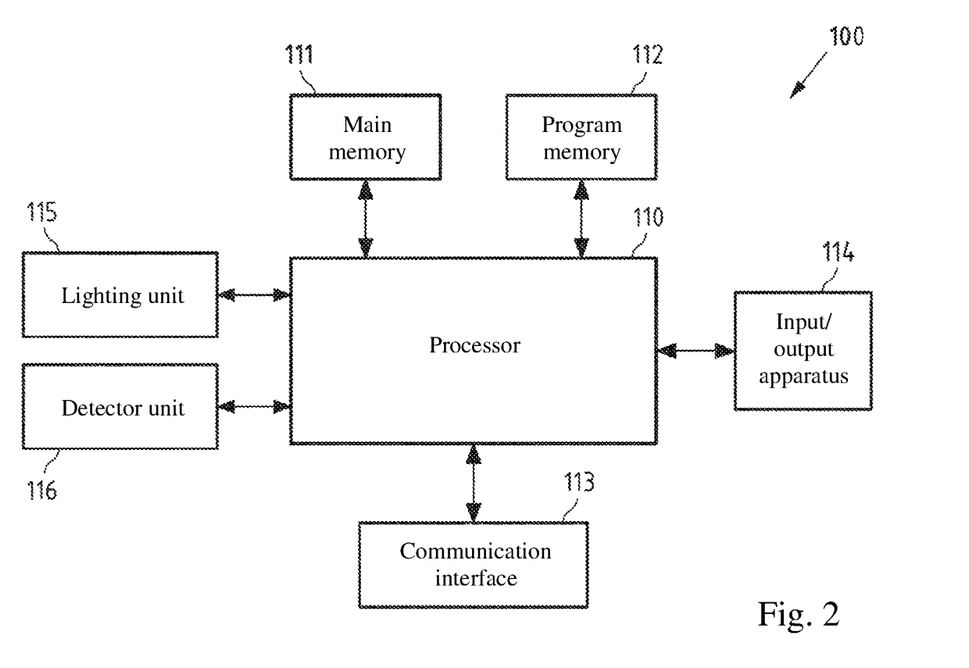
FIG. 2 is a block diagram of an embodiment of a device as contemplated herein for carrying out an embodiment of method as contemplated herein.

FIG. 2 is a block diagram 100 of an embodiment of a device as contemplated herein for carrying out an embodiment of a method as contemplated herein. By way of example, the block diagram 100 in FIG. 2 can in this case be both the lighting-detector device 200 shown in FIG. 1 and the washing machine 300 shown in FIG. 1 or a part thereof.

The device 100 has in particular a lighting unit 115. The lighting unit 115 can comprise one or more light sources, such as light-emitting diodes. The lighting unit is in this case designed to generate radiation in the visible range of the electromagnetic spectrum.

The device 100 also has a detector unit 116. The detector unit 116 comprises in particular an optoelectronic sensor. The detector unit preferably comprises a camera which is designed to take static or moving images.

The lighting unit 115 and the detector unit 116 of the device 100 can be controlled by a processor 110 or communicate therewith.

The processor 110 of the device 100 is in particular designed as a microprocessor, a microcontrol unit, a microcontroller, a digital signal processor (DSP), an application-specific integrated circuit (ASIC) or a field programmable gate array (FPGA).

The processor 110 executes program instructions that are stored in the program memory 112, and for example stores intermediate results or the like in a working memory or main memory 111. For example, the program memory 112 is a non-volatile memory such as a flash memory, a magnetic memory, an EEPROM memory (electrically erasable, programmable read-only memory), and/or an optical memory. The main memory 111 is for example a volatile or non-volatile memory, in particular a memory with random access (RAM) such as a static RAM memory (SRAM), a dynamic RAM memory (DRAM), a ferroelectric RAM memory (FeRAM), and/or a magnetic RAM memory (MRAM).

The program memory 112 is preferably a local data carrier that is permanently connected to the device 100. Data carriers that are permanently connected to the device 100 are for example hard drives that are integrated in the device 100. Alternatively, the data carrier may for example also be a data carrier that can be detachably connected to the device 100, such as a memory stick, a removable storage device, a portable hard drive, a CD, a DVD, and/or a floppy disk.

The program memory 112 for example contains the operating system of the device 100, which is loaded in the main memory 111 at least in part and is executed by the processor 110 when the device 100 is started up. In particular, when starting up the device 100, at least part of the core of the operating system is loaded in the main memory 111 and executed by the processor 110. The operating system of the device 100 is for example a Windows, UNIX, Linux, Android, Apple iOS and/or MAC operating system.

The operating system in particular allows the device 100 to be used for data processing. It for example manages operating equipment such as the main memory 111 and the program memory 112, the communication interface 113, and the input and output apparatus 114, inter alia provides basic functions by employing programming interfaces of other programs, and controls the execution of programs.

The processor 110 also controls the communication interface 113, which for example may be a network interface and may be designed as a network card, network module and/or modem. The communication interface 113 is in particular designed to establish a connection between the device 100 and other devices, in particular via a (wireless) communication system, for example a network, and to communicate therewith. The communication interface 113 may for example receive data (via the communication system) and forward said data to the processor 110, and/or receive and transmit data from the processor 110 (via the communication system). Examples of a communication system are a local network (LAN), a wide area network (WAN), a wireless network (for example in accordance with the IEEE 802.11 standard, the Bluetooth (LE) standard and/or the NFC standard), a wired network, a mobile network, a telephone network, and/or the Internet. For example, communication can be established with the Internet and/or other devices by employing the communication interface 113. In the case of the device 200, communication can be established with the washing machine 300 or the mobile device 400 by employing the communication interface 113, for example. In the case of the device 300, communication can be established with the lighting-detector device 200 or the mobile device 400 by employing the communication interface 113, for example.

Furthermore, the processor 110 can control at least one input/output apparatus 114. The input/output apparatus 114 is for example a keyboard, a mouse, a display unit, a microphone, a touch-sensitive display unit, a speaker, a read apparatus, a drive, and/or a camera. The input/output apparatus 114 may for example receive user inputs and forward said inputs to the processor 110, and/or receive and output information for the user of the processor 110.

Figure 3:
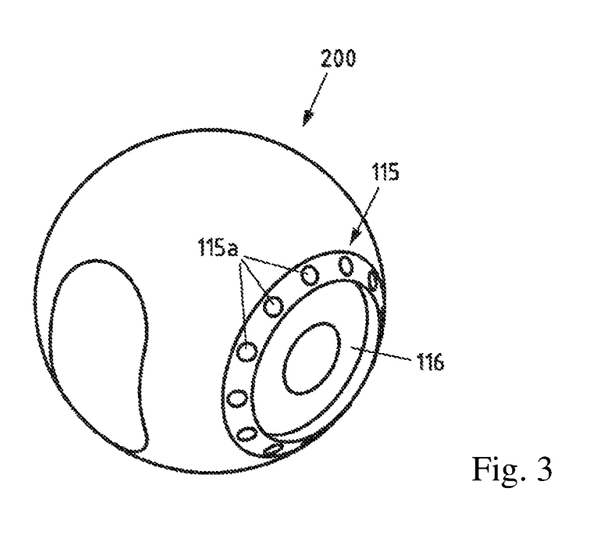
FIG. 3 is a schematic perspective view of the lighting-detector device from FIG. 1.

FIG. 3 is a schematic perspective view of the lighting-detector device 200 from FIG. 1. The lighting-detector device 200 is a device that is separate from the washing machine 300. The lighting-detector device 200 has a substantially spherical watertight housing which includes at least in part of a non-rigid or resilient material. The lighting-detector device 200 comprises a lighting unit 115 which in this case comprises a plurality of light-emitting diodes 115a. The lighting unit can illuminate at least some of the items of laundry which are located in a laundry container of a washing machine and are to be subjected to a washing process. The lighting-detector device 200 also has a detector unit 116, which is in this case designed as a camera. The detector unit 116 can determine color information that is indicative of one or more colors of at least some of the illuminated items of laundry that are located in a laundry container of a washing machine. The lighting-detector device 200 is designed to be introduced into a laundry container of a washing machine (for example the washing machine 300) and to be mixed thoroughly with the laundry therein in a freely movable manner. However, it is also conceivable for the lighting-detector device 200 to be designed such that it can be arranged outside of a washing machine, for example can be fastened in the region of the loading door of a washing machine, such that optical access to the laundry container of the washing machine is possible for the lighting-detector device.

Figure 4:
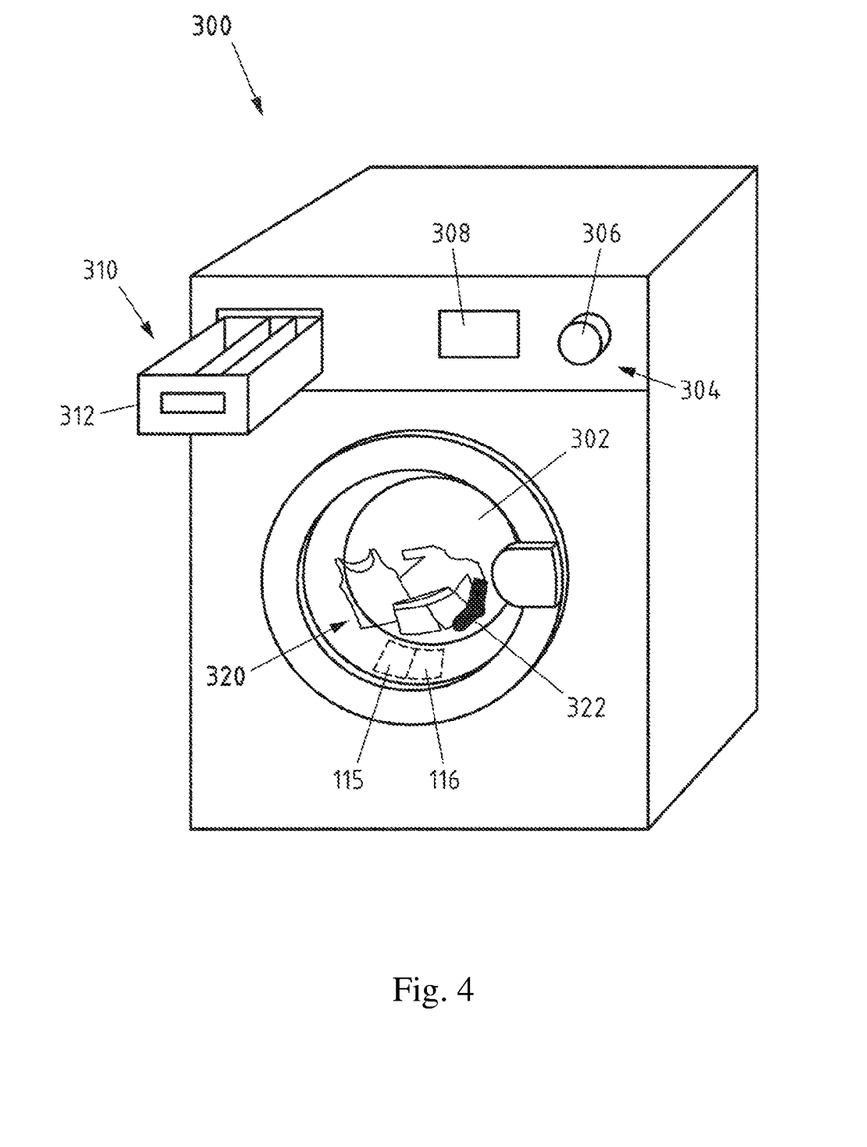
FIG. 4 is a schematic perspective view of the washing machine from FIG. 1.

FIG. 4 is a schematic perspective view of the washing machine 300 from FIG. 1. In this case, the device 100 shown in FIG. 2 is the washing machine 300 or is integrated therein. In this case, the washing machine 300 is an automatic domestic washing machine for textiles which is designed as a drum washing machine and in which a washing drum 302 rotates about a horizontal axis (front-loading washing machine). However, the use of other types of cleaning devices is also conceivable. In addition to the drum 302, the washing machine 300 comprises user interfaces 304 in the form of an operating element 306 and a display element 308. The operating element 306 is designed as a rotary knob and can be used to set different washing parameters, for example the washing program and/or the washing temperature. The display element 308 can optically display information to the user. However, the washing machine 300 can also have further user interfaces. The washing machine 300 further comprises a dispensing apparatus 310 which comprises a dispensing drawer 312. This is used to receive a cleaning agent.

The washing machine 300 also comprises a lighting unit 115 and a detector unit 116, which are only shown schematically here. The lighting unit 115 and the detector unit 116 are arranged in the region of the laundry container seal of the washing drum 302. At least some of the items of laundry 320 which are located in a laundry container 302 of a washing machine 300 and are to be subjected to a washing process can be illuminated by employing the lighting unit. Color information that is indicative of one or more colors of at least some of the illuminated items of laundry 320 that are located in the laundry container 302 of the washing machine 300 can be determined by employing the detector unit 116. A potentially undesirable item of laundry 322 is in this case located among the items of laundry 320. Due to the color difference of the (for example black) item of laundry 322 in comparison with the remaining (for example white) items of laundry 320, the item of laundry 322 can be identified as a potentially undesirable item of laundry 322.

Figure 5:
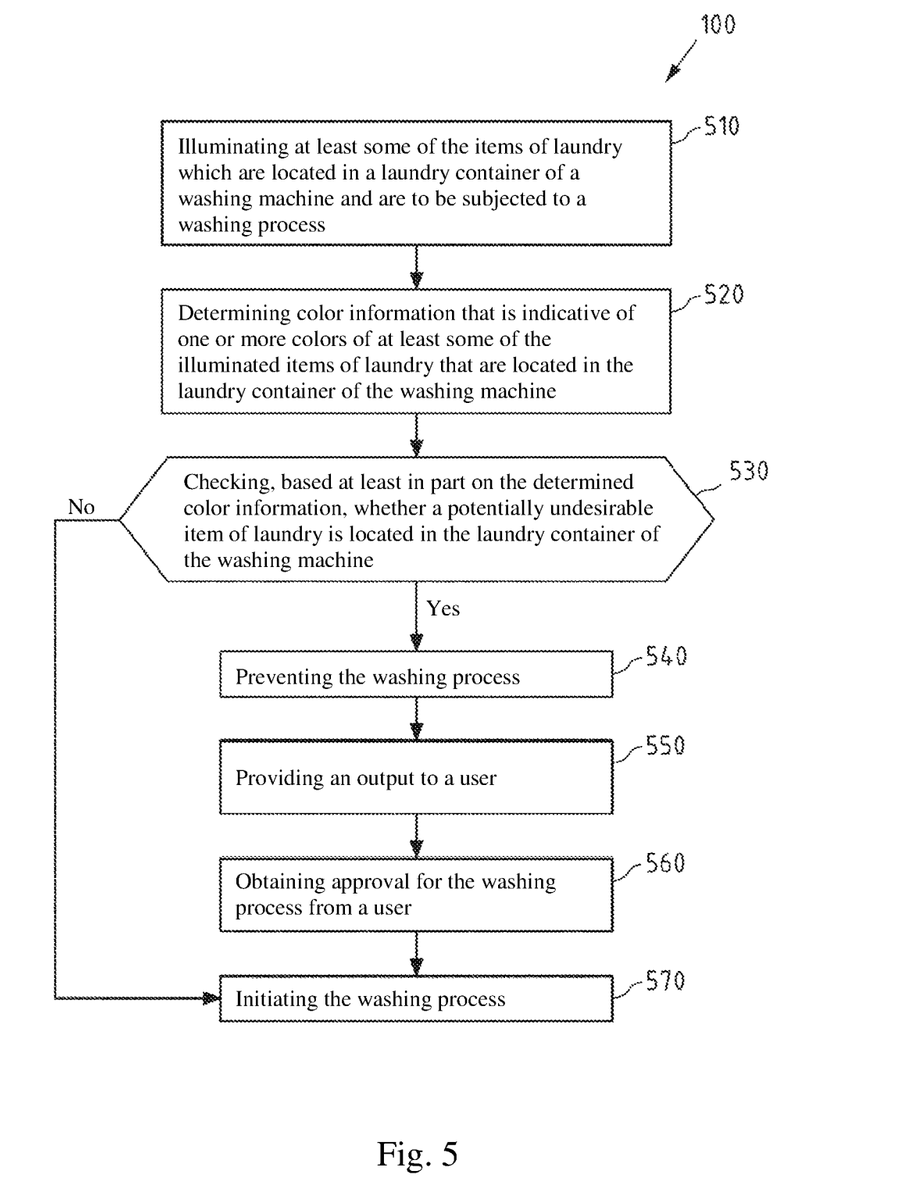
FIG. 5 is a flow diagram of an embodiment of a method as contemplated herein.

FIG. 5 is a flow diagram 500 of an embodiment of a method as contemplated herein, which is carried out in this case by the system 1. However, embodiments of the method can also be carried out just by individual devices, for example the device 200 or the device 300 alone.

First, a laundry container of a washing machine is loaded with items of laundry (for example items of laundry 320 in the laundry container 302 of the washing machine 300). If a separate lighting-detector device (e.g. the device 200) is provided, this is either introduced into the laundry container with the items of laundry or for example fixed outside the laundry container. However, if both the lighting unit and the detector unit are integral with the washing machine (such as in the washing machine 300), this is not necessary.

The items of laundry located in the laundry container of the washing machine can be mixed, while dry, by the washing machine before the washing process begins. In so doing, the washing machine can advantageously establish, by monitoring a parameter of the drive (for example the current consumption) of the washing machine, that the items of laundry located in the laundry container of the washing machine are temporarily in free fall.

During the thorough mixing (in addition or alternatively also before and/or after said mixing), at least some of the items of laundry 320 which are located in a laundry container of a washing machine (for example the washing drum 302 of the washing machine 300) and are to be subjected to a washing process are first illuminated, for example by the lighting unit 115 (action 510).

This makes it possible, irrespective of the prevailing light conditions in the washing drum or in the space in which the washing machine is located, to determine color information that is indicative of one or more colors of at least some of the illuminated items of laundry that are located in the laundry container of the washing machine, for example by employing the detector unit 116 (action 520). The determined color information can be subjected to processing algorithms if required.

A check can then be carried out, based at least in part on the determined color information, as to whether a potentially undesirable item of laundry (for example the item of laundry 322) is located in the laundry container of the washing machine.

If, for example, it is established that no potentially undesirable item of laundry is located in the laundry container of the washing machine, the washing process can then be initiated (action 570).

However, if for example it is established that (at least) one potentially undesirable item of laundry is located in the laundry container of the washing machine (for example because an item of laundry has a color difference that is too great in comparison with a further or the remaining items of laundry), the washing process is preferably prevented (action 540).

In addition, an output to a user can also be provided (action 550). This can, for example, inform the user that a potentially undesirable item of laundry has been detected. Likewise, a (static or moving) image of the item of laundry can be output to the user. The output can be provided, for example, via a user interface of the washing machine (for example the display element 308) and/or via a mobile device (for example the mobile device 400).

The user can then decide whether the potentially undesirable item of laundry is actually an undesirable item of laundry or whether it is an item of laundry that is desirable or is deliberately located in the laundry container.

If the user has removed the undesirable item of laundry from the laundry container, or if the item of laundry is intended to be washed, the user can approve initiation of the washing process. This can also be accomplished via the user interface of the washing machine (for example the display element 308) and/or via the mobile device (for example the mobile device 400).

If the washing machine receives the approval from the user (action 560), the washing process can be initiated (action 570). Alternatively, or in addition, the washing process can also be initiated independently of approval of the user, if a predefined time (for example since the output to the user) is reached or exceeded.

It is also possible to determine one or more recommended parameters (such as a recommended temperature, a recommended dosage, a recommended washing agent) for the washing process, based at least in part on the determined color information. As a result, a corresponding recommendation can then be output to the user. Alternatively, or in addition, the washing process can also be influenced by the corresponding parameters (as far as possible) also being automatically set.

Figure 6:
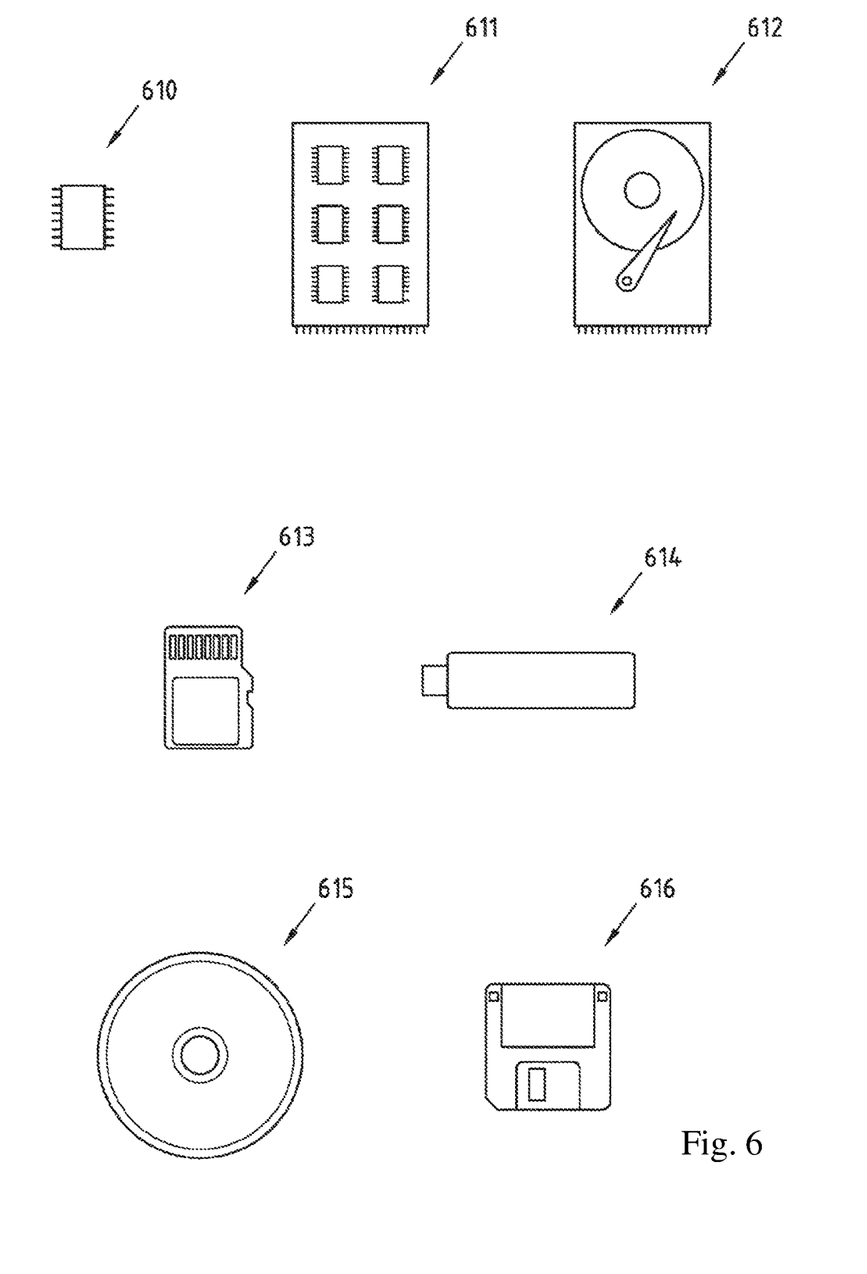
FIG. 6 shows different embodiments of a memory medium.

FIG. 6 lastly shows different embodiments of memory media on which an embodiment of a computer program as contemplated herein can be stored. The memory medium can be a magnetic, electrical, optical and/or different kind of memory medium, for example. The memory medium can, for example, be part of a processor (e.g. of the processor 110 in FIG. 2), for example a (non-volatile or volatile) program memory of the processor or a part thereof (such as the program memory 112 in FIG. 2). Embodiments of a memory medium are a flash memory 610, an SSD hard drive 611, a magnetic hard drive 612, a memory card 613, a memory stick 614 (e.g. a USB stick), a CD-ROM or DVD 615, or a floppy disk 616.

The embodiments of the present disclosure described in this specification and the optional features and properties set out in this regard in each case are also intended to be understood to be disclosed in any combination with one another. In particular, unless explicitly stated otherwise, the description of a feature included in an embodiment should not be understood in the present case such that the feature is indispensable or essential for the function of the embodiment. The sequence of method steps set out in this specification in the individual flow diagrams is not compulsory, and alternative sequences of the method steps are conceivable. The method steps can be implemented in different ways, and therefore implementation in software (by employing program instructions), hardware, or a combination of both are conceivable for implementing the method steps.

Individual method steps (for example that of obtaining information, checking an imminent step) which do not necessarily need to be carried out together with determining color information can be carried out by another device that is connected, in particular by employing a communication system, to the device comprising the sensor apparatus. A further device of this kind may be for example a server and for example a part or component of a computer cloud, which provides data-processing resources dynamically for different users in a communication system. A computer cloud is in particular understood to mean a data-processing infrastructure in accordance with the definition from the National Institute for Standards and Technology (NIST) for the term "cloud computing". One example of a computer cloud is a Microsoft Windows Azure platform.

It is also possible for the process of repeatedly obtaining and/or determining information, e.g. quantity information and/or quality information, to be used for machine learning. This means that a profile can for example be determined based on machine learning at least in part. Machine learning is understood to mean that an artificial system (for example a device according to the second aspect or a system according to the third aspect) learns from examples, and can generalize said examples following the learning phase. This mean that it does not simply learn the examples by heart, but that patterns and regularities are recognized in the learning data. Various approaches can be taken for this purpose. For example, supervised learning, semi-supervised learning, unsupervised learning, reinforcement learning and/or active learning can be used. Supervised learning can for example be carried out by employing an artificial neural network (such as a recurrent neural network) or by employing a support vector machine. In addition, unsupervised learning can for example be carried out by employing an artificial neural network (for example an autoencoder). In particular the repeatedly obtained and/or determined information, in particular quantity information and/or quality information, is used, for example, as learning data.

Alternatively, or additionally, it is conceivable for the obtained and/or determined information, in particular quantity information and/or quality information, to be associated with other information, for example with the number and/or the age of the person in a household in order to produce a personalized usage profile, or for example with the seasons in order to produce a seasonal usage profile. Alternatively, a cleaning or washing profile can be produced.

As a result of these measures, the reliability of a check as to whether a supply of the cleaning agent is likely to be used up is increased.

Terms used in the claims such as "comprise", "have", "include", "contain" and the like do not exclude further elements or steps. The wording "at least in part" covers both "partly" and "completely". The wording "and/or" is intended to be understood such that both the alternative and the combination are intended to be disclosed, i.e. "A and/or B" means "(A) or (B)" or "(A and B)". The use of the indefinite article does not exclude a plurality. A single device can carry out the functions of a plurality of units or devices mentioned in the claims. Reference signs stated in the claims should not be considered to limit the elements and steps used.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:

1. A method carried out by a washing machine including a lighting unit and a detector unit, the method comprising:

illuminating, by the lighting unit, at least a part of items of laundry which are located in a laundry container of the washing machine and are to be subjected to a washing process;

determining, by the detector unit, color information that is indicative of one or more colors of at least part of the illuminated items of laundry that are located in the laundry container of the washing machine;

determining, based on the color information indicating a first color and a second color having a color difference exceeding a predefined color, an undesirable item of laundry is located in the laundry container of the washing machine;

preventing a start of the washing process when it is established that an undesirable item of laundry is located in the laundry container of the washing machine; and providing an output to a user indicating the undesirable item of laundry is located in the laundry container of the washing machine.

2. The method according to claim 1, wherein the lighting unit and/or the detector unit are arranged inside the laundry container of the washing machine.

3. The method according to claim 2, wherein the lighting unit and/or the detector unit are freely movable inside the laundry container of the washing machine.

4. The method according to claim 1, wherein the lighting unit and/or the detector unit are arranged outside the laundry container of the washing machine.

5. The method according to claim 1, wherein the method also comprises:

subjecting the determined color information to a processing algorithm.

6. The method according to claim 1, wherein the method also comprises:

thoroughly mixing the items of laundry that are located in the laundry container of the washing machine before the washing process begins.

7. The method according to claim 6, wherein the thorough mixing is carried out in such a way that the items of laundry located in the laundry container of the washing machine are temporarily in free fall.

8. The method according to claim 7, wherein the method also comprises:

establishing that the items of laundry located in the laundry container of the washing machine are temporarily in free fall, at least based on at least one parameter of a drive driving the laundry container.

9. The method according to claim 1, wherein the method also comprises:

initiating the washing process when approval for the washing process is obtained from the user.

10. The method according to claim 1, wherein the method also comprises:

initiating or resuming the washing process at or after a predefined time and influencing one or more parameters of the washing process.

11. The method according to claim 1, wherein the method also comprises:

determining one or more recommended parameters for the washing process, based at least in part on the determined color information.

12. The method according to claim 11, wherein the one or more recommended parameters for the washing process comprise:

a temperature parameter, a spinning parameter, a washing program parameter, and/or a washing agent parameter.

13. The method according to claim 11, wherein the method also comprises:

providing or triggering provision of a recommendation based on the one or more determined recommended parameters for the washing process to the user.

14. The method according to claim 11, wherein the method also comprises:

influencing the washing process, based at least in part on the one or more determined recommended parameters for the washing process.

* * * * *